United States Patent [19]

Crane

[11] Patent Number: 4,479,228
[45] Date of Patent: Oct. 23, 1984

[54] LOCAL COMPUTER NETWORK TRANSCEIVER

[75] Inventor: Ronald C. Crane, Mountain View, Calif.

[73] Assignee: 3Com Corporation, Mountain View, Calif.

[21] Appl. No.: 242,708

[22] Filed: Mar. 11, 1981

[51] Int. Cl.³ ............................................. H04L 23/00
[52] U.S. Cl. ..................................... 375/7; 340/825.5; 375/36
[58] Field of Search ........................ 340/825.5, 825.51; 364/900; 370/24, 28, 32, 60, 85; 375/7, 36, 121; 178/2 R; 455/58

[56] References Cited

U.S. PATENT DOCUMENTS

| | | | |
|---|---|---|---|
| 2,852,760 | 9/1958 | Eckhardt | 340/825.5 |
| 4,055,835 | 10/1977 | Thornton | 340/825.5 |
| 4,063,220 | 12/1977 | Metcalfe et al. | 340/825.5 |
| 4,254,496 | 3/1981 | Munter | 370/85 |
| 4,271,505 | 6/1981 | Menot et al. | 370/85 |

OTHER PUBLICATIONS

*The Ethernet: A Local Area Network*, Version 1.0, published by Digital Equipment Corporation, Intel Corporation, and Xerox Corporation, Sep. 30, 1980.
"Ethernet: Distributed Packet Switching for Local Computer Networks", by Robert M. Metcalfe and David R. Boggs, originally published by the Xerox Palo Alto Research Center, May, 1975.
"Practical Considerations in Ethernet Local Network Design", by Ronald C. Crane and Edward A. Taft, originally published by the Xerox Systems Development Division and Palo Alto Research Center, Oct. 1979.
"Measured Performance of an Ethernet Local Network", by John F. Shoch and Jon A. Hupp, originally published by the Xerox Palo Alto Research Center, Feb. 1980.
"Evolution of the Ethernet Local Computer Network", by John F. Shoch, David D. Redell, Yogen K. Dalal, and Ronald C. Crane, published by the Xerox Palo Alto Research Center and the Systems Development Department, Feb. 1981.

Primary Examiner—Benedict V. Safourek

[57] ABSTRACT

An improved local computer network transceiver comprising transmitter, receiver, collision detection, and power supply circuits. The transceiver is connected between a plurality of host CPU controller interfaces and a coaxial cable with the coaxial cable being utilized as the communication medium at a nominal data rate of 10 megabits per second. The transmitter circuit includes triple redundancy in the output circuits to prevent single and double component failures from causing the transceiver to continuously jam the coaxial cable. The receiver circuit includes input compensation in order to permit use of the transceiver with long lengths of coaxial cable. The transceiver is capable of sending very wide pulses in order to aid in the location of coaxial cable impedance discontinuities (i.e. a time domain reflectometer function), and the ground planes associated with the host CPU interface cable and coaxial cable are physically separated by a plurality of interstage isolation transformers.

8 Claims, 6 Drawing Figures

LOCAL COMPUTER NETWORK TRANSCEIVER

BACKGROUND OF THE INVENTION

1. Field of the Invention

The invention relates to the field of local computer networks and finds particular application when used with a high speed digital serial bus such as coaxial cable.

2. Description of the Prior Art

Due to technological trends that are reducing the cost of computation (for example, memory and microprocessor costs), the proliferation of high performance workstations is forecast for the so-called office of the future. Such workstations shall be capable of both word and data processing applications. However, the cost of semiconductor devices has historically dropped approximately fifty percent every two years while the cost of mechanical peripheral devices (for example, disk drives, tape drives, and printers) has not so eroded. This fact has tended to make the sharing of such relatively expensive peripherals between workstations an economic necessity. While computer peripheral devices have been interconnected in the prior art using input/output channels and relatively low speed digital links, a general purpose high speed digital serial link that presents a standard interface to which multiple manufacturers of equipment can design is highly desirable. The specifications for such a high speed digital serial link have been proposed and are known generically as the Ethernet.

The original Ethernet technology was the subject of U.S. Pat. No. 4,063,220 to Metcalfe et al. (filed Mar. 31, 1975; issued Dec. 13, 1977). Metcalfe et al. describes a multipoint data communication system with collision detection. A communication medium is utilized to permit the high speed serial transmission of packets of information which are transmitted and received by transceivers connected to said communication medium. Said medium of a preferred embodiment was disclosed to be coaxial cable. Further, a practical implementation of a transceiver for use with the multipoint data communication system with collision detection is disclosed in FIG. 5. However, the disclosed transceiver is subject to many technical and/or performance limitations:

The transceiver as disclosed utilizes DC coupling at the receiver input necessitating strict control over (1) the absolute DC level on the coaxial cable and (2) the receiving DC reference threshold.

Signalling hysteresis must be maintained at extremely small allowable levels lest signal symmetry degrade with long coaxial cable lengths.

The details for the practical supply of voltages V+ and F+ are not disclosed, but severely impact the practical implementation of such a device.

The methods of collision detection would have to be changed from the disclosed design for operation at high signalling rates (for example, 10 megabits per second) and for operation with AC coupled receiver input.

Single-ended signalling is utilized in the interface cable leads.

Extreme care must be exercised in the design of the isolation stages as disclosed lest undesirable radio frequency interference be generated.

The transceiver as disclosed is unable to assist in the location of coaxial cable impedance discontinuities or faults.

The transceiver as disclosed is also subject to failure caused by voltages on the coaxial cable opposite in polarity from the normal signalling polarity.

Further information on the Ethernet has been also disclosed in four technical reports:

*Ethernet: Distributed Packet Switching for Local Computer Networks*, by Robert M. Metcalfe and David R. Boggs, originally published by the Xerox Palo Alto Research Center, May, 1975.

*Practical Considerations in Ethernet Local Network Design*, by Ronald C. Crane and Edward A. Taft, originally published by the Xerox Systems Development Division and Palo Alto Research Center, October, 1979.

*Measured Performance of an Ethernet Local Network*, by John F. Shoch and Jon A. Hupp, originally published by the Xerox Palo Alto Research Center, February, 1980.

*Evolution of the Ethernet Local Computer Network*, by John F. Shoch, David D. Redell, Yogen K. Dalal, and Ronald C. Crane, published by the Xerox Palo Alto Research Center and the Systems Development Department, February, 1981.

While the above technical references are relevant to an understanding of the physical signalling characteristics on an Ethernet coaxial cable and link level control procedures, they do not disclose sufficient information required by one skilled in the art to construct a high speed Ethernet transceiver.

In addition to the above references, an Ethernet specification proposing a 10 megabit per second standard coaxial cable based serial bus was published on Sept. 30, 1980, jointly by Digital Equipment Corporation, Intel Corporation, and Xerox Corporation (version 1.0). The proposed 10 megabit per second Ethernet joint specification is insufficient with respect to details as to how to implement a transceiver to function at such signalling frequencies. Further, the performance limitations of the transceiver as disclosed by Metcalfe et al. become exacerbated at 10 megabits per second, the actual design being intended to operate at slightly less than 3 megabits per second (reference the May, 1975, paper by Metcalfe and Boggs).

SUMMARY OF THE INVENTION

It is thus an object of the present invention to provide a practical design for a high performance Ethernet transceiver.

It is an object of the present invention to provide an Ethernet transceiver that is easily manufacturable.

It is an object of the present invention to provide an Ethernet transceiver that can communicate at high data rates over long lengths of coaxial cables.

It is an object of the present invention to provide an Ethernet transceiver capable of collision detection at high data rates over long lengths of coaxial cables.

It is another object of the present invention to provide an Ethernet transceiver which can enhance the overall Ethernet system reliability through a reduction in the susceptability of the transceiver to failure modes which can disable the entire network.

It is another object of the present invention to provide an Ethernet transceiver with an improved ability to withstand high coaxial cable fault voltages.

It is another object of the present invention to provide an Ethernet transceiver which has the capability to detect coaxial cable impedance discontinuities.

It is another object of the present invention to provide an Ethernet transceiver which has a minimum of power consumption permitting lower temperature and thus higher reliability operation.

It is an object of the present invention to provide an Ethernet transceiver with a high impedance connection to the coaxial cable.

It is an object of the present invention to provide an Ethernet transceiver with reduced spurious RF emissions.

It is another object of the present invention to provide an Ethernet transceiver with controlled rise and fall times of the transmitted signals in order to minimize reflections on the coaxial cable.

It is yet another object of the present invention to provide an Ethernet transceiver which is capable of operation over a relatively wide range of power supply voltages.

It is yet another object of the present invention to provide an Ethernet transceiver which is capable of operation with relatively longer interface cables between the Ethernet controller and transceiver.

It is yet another object of the present invention to provide an Ethernet transceiver which is functionally compatible with the 10 megabit per second DEC-Intel-Xerox Ethernet.

The Ethernet transceiver of the present invention is functionally divided into three signalling components: transmitting, receiving, and collision detection. The transmitted signal is generated by a properly terminated balanced differential signal from the controller. The transmitter includes rise and fall time limiting of the signal and further includes, in a preferred embodiment, triple redundancy for transmit protection. That is, three logical circuit conditions must exist to cause a current to flow into the center conductor of the coaxial cable. Or, in other words, any two components can fail in the output circuit without causing signal transmission which might jam the coaxial cable bringing down the network. Further, a single voltage reference is utilized to generate the amplitude of the transmitted signal, an inverted transmitted signal (that is, 180 degrees out of phase with the transmitted signal), and the reference threshold for the collision detection circuit. The use of a single voltage reference creates inherent tracking between the amplitude of the transmitted signal, inverted transmitted signal, and collision detection reference threshold. This tends to making collision detection relatively insensitive to the accuracy of the reference, reducing cost, improving manufacturability, and enhancing ultimate performance.

The receiver circuit is coupled to the coaxial cable with an extremely high impedance and a low capacitance (that is, the coupling capacitance does not exceed a few picofarads). The receiver circuit also includes two coupling stages with high frequency emphasis in order to compensate for signal distortion which occurs over long lengths of coaxial cable.

The collision detection circuitry functions by subtracting the transmitted signal from a signal simultaneously received from the coaxial cable.

The design of the transceiver of the present invention further includes a time domain reflectometer (TDR) function. Time domain reflectometry is a method for locating transmission line impedance discontinuities. In the case of the present invention, the transmission line is the coaxial cable, and the impedance discontinuities are most often coaxial cable shorts or opens. The TDR function operates by transmitting an edge (i.e. a step function) into the cable and waiting for reflections from that edge to appear. The amount of time that elapses between the original transmission of the edge and the appearance of its reflection determines the the distance between the impedance discontinuity and the transmitter. The polarity of the reflected edge determines the type of discontinuity. A short circuit of the coaxial cable would invert the reflected edge with respect to the polarity of the transmitted edge; an open circuit would reflect an edge of the same polarity as the transmitted edge.

Lastly, the Ethernet transceiver of the present invention includes special attention to the design of the interstage isolation transformers to prevent unwanted RF emissions. For the same purpose of suppressing such EMI (that is, electromagnetic interference) as well as for safety reasons, the design of the present invention separates the coaxial cable ground plane from the interface cable ground plane.

It is thus an advantage of the present invention to provide an Ethernet transceiver that is cost effective, manufacturable, and of extreme reliability.

It is another advantage of the present invention to provide an Ethernet transceiver that can communicate and detect collisions at a nominal data rate of 10 megabits per second over relatively long lengths of coaxial cable.

It is another advantage of the present invention to provide an Ethernet transceiver which can assist in the detection and location of coaxial cable impedance discontinuities.

It is yet another advantage of the present invention to provide an Ethernet transceiver which can withstand relatively high transient coaxial cable voltages.

It is yet another advantage of the present invention to provide an Ethernet transceiver with reduced spurious RF emissions and controlled transmitted signal rise and fall times for minimized coaxial cable reflections.

It is yet another advantage of the present invention to provide an Ethernet transceiver which can operate over wide power supply limits and over longer interface cable lengths without signal degradation.

It is further an advantage of the present invention to provide a practical Ethernet transceiver that is compatible with the DEC-Intel-Xerox Ethernet.

These and other objects and advantages of the present invention will become apparent by reference to the following description of a preferred embodiment in conjunction with the referenced drawing figures.

DESCRIPTION OF A PREFERRED EMBODIMENT

Figure 1:
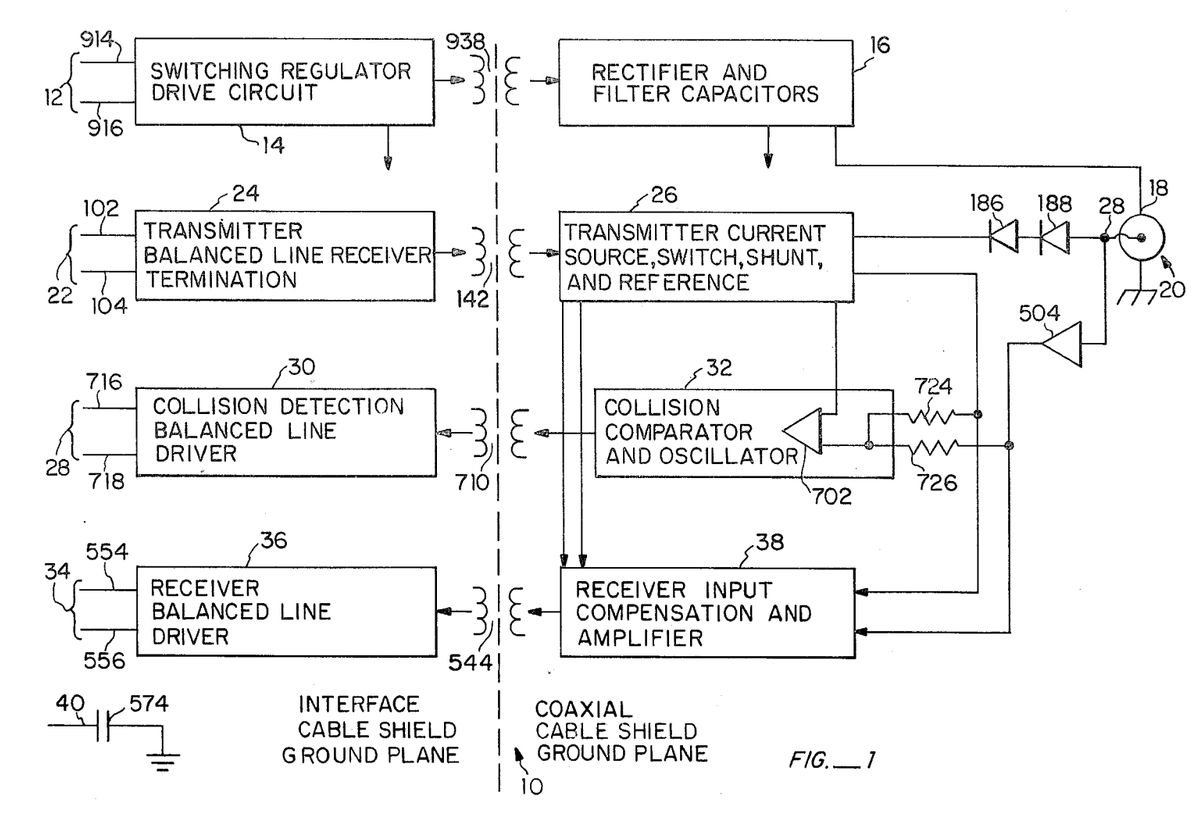
FIG. 1 is a block diagram illustrating the major functional components of the the Ethernet transceiver of the present invention.

Referring to FIG. 1, a block diagram of a preferred embodiment of an Ethernet transceiver according to the present invention is shown by the general reference numeral 10. Transceiver 10 is constructed from four functional components: a DC to DC inverter power supply; transmitter circuitry; collision detection circuitry; and receiver circuitry. On the input or controller interface cable side of transceiver 10 are nine connections. A first pair of connections 12 provide raw DC+ and DC− to the power supply of the transceiver 10. The power supply in a preferred embodiment is a DC to DC inverter constructed from a switching regulator drive circuit 14 and a rectifier and filter capacitor circuit 16. One lead of the output of rectifier and filter capacitor circuit 16 is tied to a shield 18 of a coaxial cable 20. The power supply circuitry is described in greater detail below in connection with FIG. 4.

The transmitter circuitry receives input from the controller interface cable from a pair of connections 22. The transmitter in a preferred embodiment is constructed from a transmitter balanced line receiver termination circuit 24 and a transmitter current source, switch, shunt, and reference circuit 26. The output of circuit 26 connects to a center conductor 28 of coaxial cable 20. The transmitter circuitry is described in greater detail below in connection with FIG. 2 and FIG. 3.

The collision detection circuitry provides a signal to a pair of connections 28 which are utilized by the controller (not shown) to respond to a collisiion condition. The collision circuitry is constructed in a preferred embodiment from a collision detection balanced line driver 30 and a collision comparator and oscillator 32. The collision detection circuitry is described in greater detail below in connection with FIG. 2.

The receiver circuitry provides a signal to a pair of connections 34 over which received information is conveyed to the controller. The receiver circuitry is constructed in a preferred embodiment from a receiver balanced line driver 36 and a receiver input compensation and amplifier circuit 38. The receiver circuitry is described below in greater detail in connection with FIG. 2. The ninth connection to the controller by transceiver 10 is an interface cable shield ground connection 40.

It should be noted that an important aspect of the design of transceiver 10 of the present invention is that each of the four functional components (that is, the power supply, transmitter, collision detection, and receiver circuitry) is divided into two sub-functional blocks. Each sub-functional block is divided about an isolation transformer as shown in FIG. 1. As an important aspect of electromagnetic compatibility and radio frequency shielding, these isolation transformers form a physical demarcation between the interface cable shield 40 radio frequency (RF) ground plane and the coaxial cable shield 18 ground plane as noted in FIG. 1.

Transmitter Section

Figures 2, 2A:
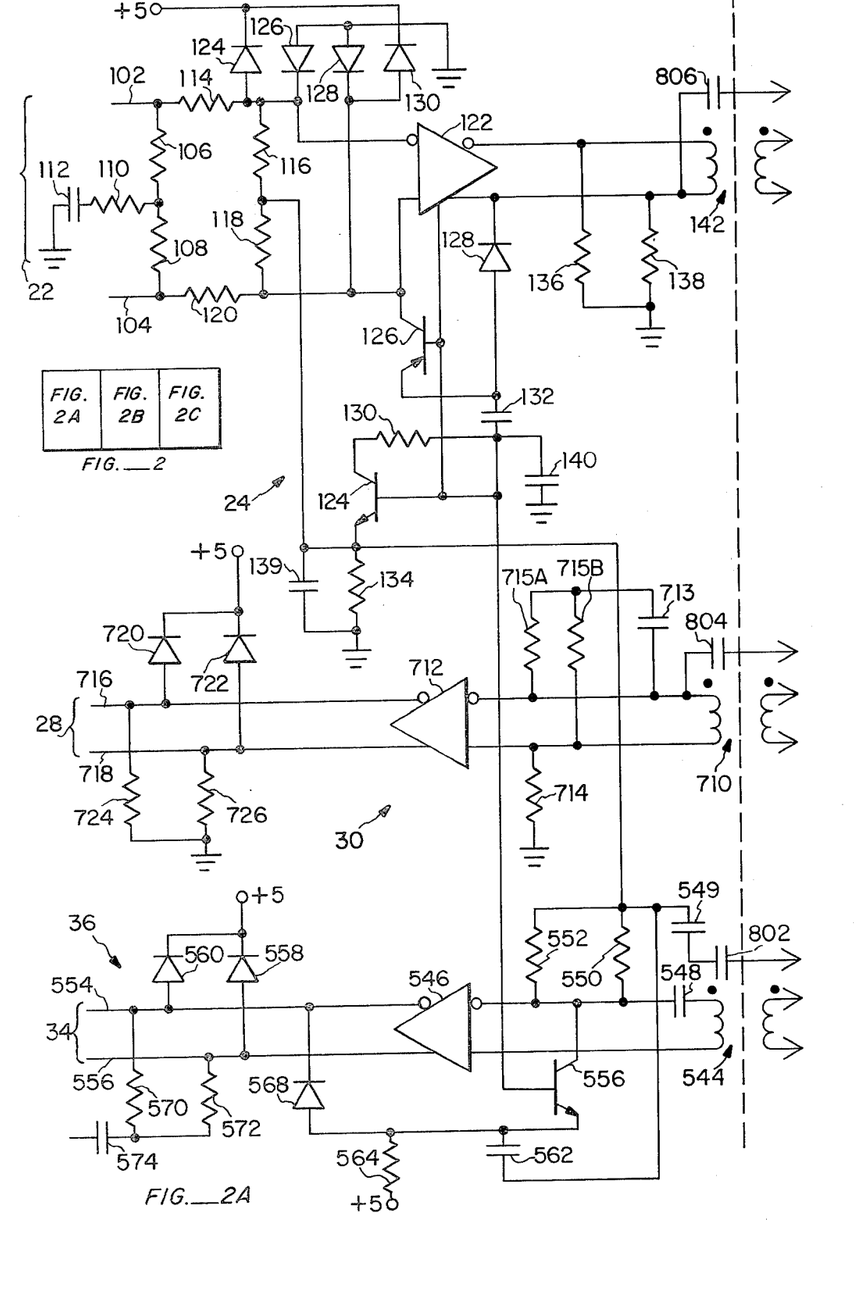
FIG. 2 is a diagram showing the proper relationship of FIGS. 2A and 2B.
FIGS. 2A, 2B and 2C together are a partial schematic diagram of a preferred embodiment of the Ethernet transceiver of the present invention.
Figure 2B:
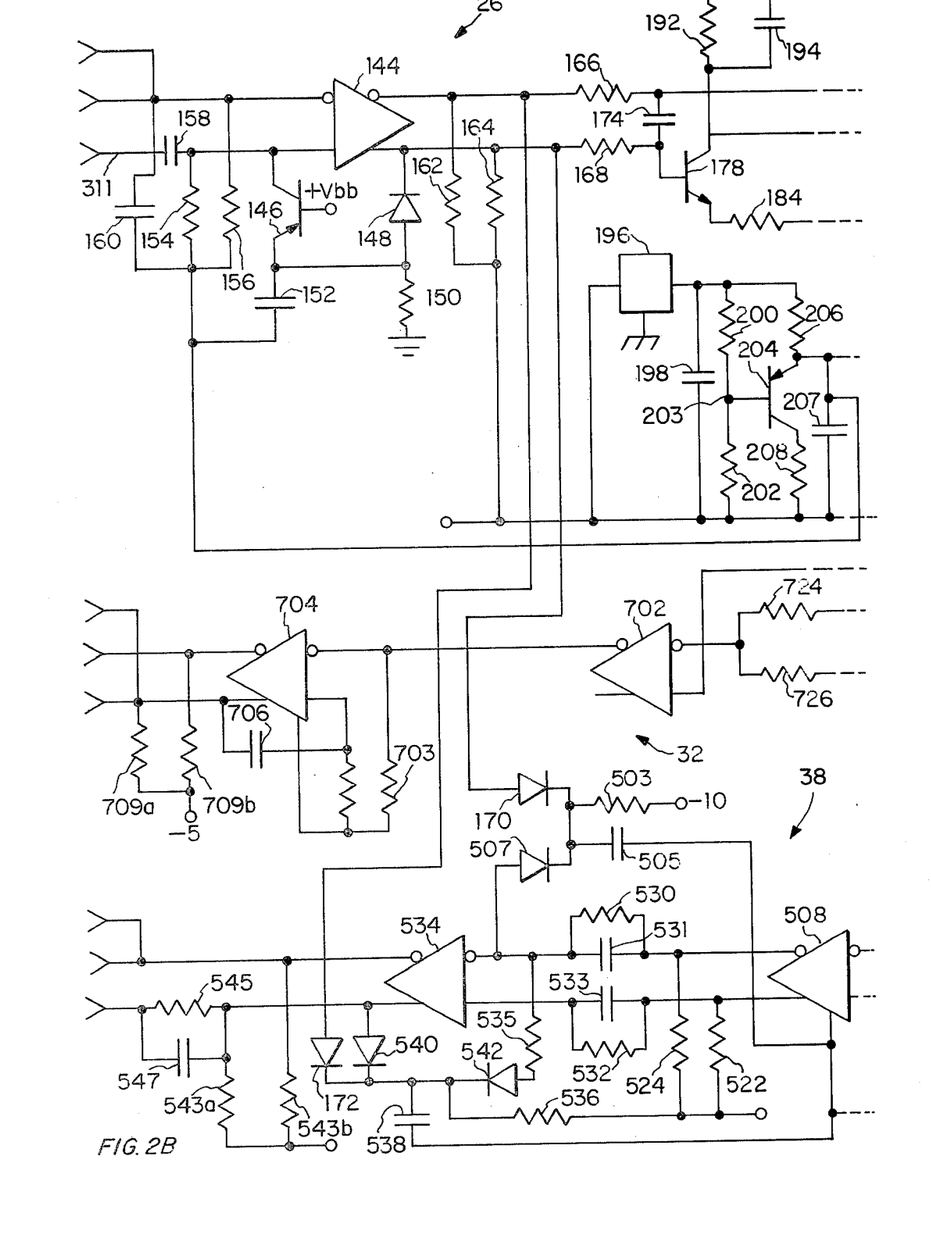
Figure 2C:
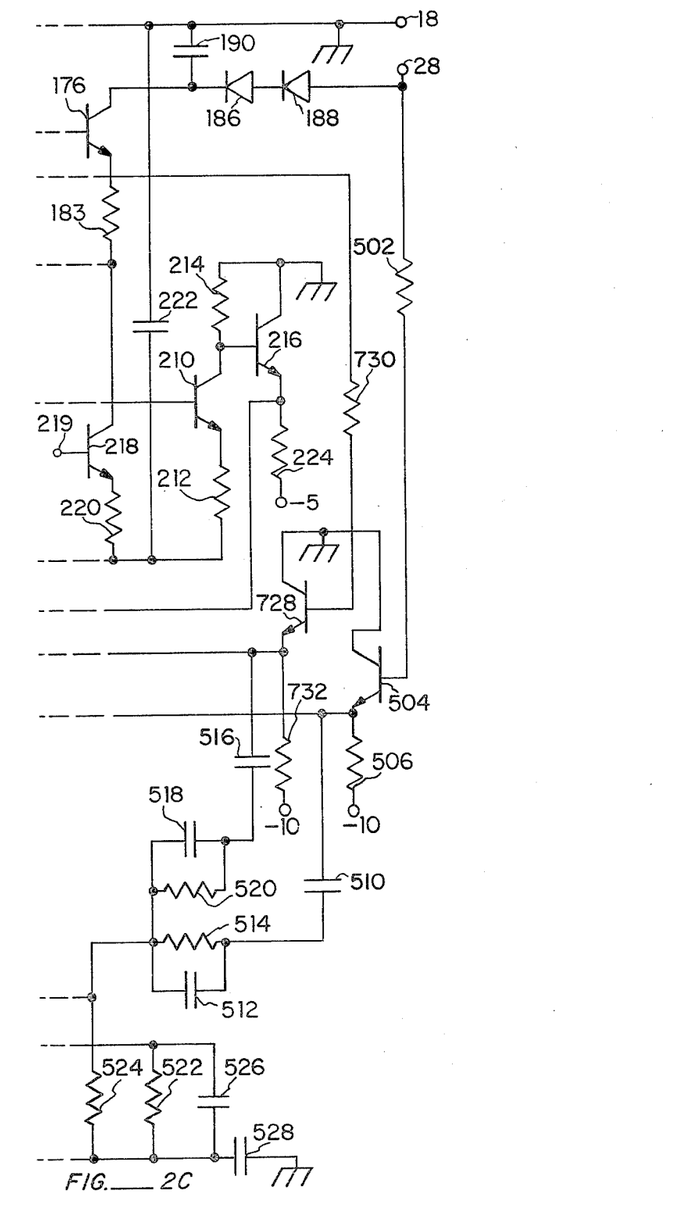

Referring to FIG. 2, the transmitter balanced line receiver termination 24 of the transceiver 10 of the present invention is driven by a balanced differential signal from an Ethernet controller (not shown) connected to the transceiver 10 in a preferred embodiment by a multiple twisted pair cable. The balanced differential transmit signal is impressed upon a line 102 and a line 104. The transceiver 10 terminates the balanced differential signal in a 78 ohm (nominal) differential load provided by a pair of resistors 106 and 108 in a preferred embodiment. A common mode termination of 31 ohms (nominal) is provided by a center tap constructed from a resistor 110 and a capacitor 112. An attenuator network constructed from resistors 114, 116, 118, and 120 is used to reduce the common mode signal that appears at the input of an emitter coupled logic (ECL) amplifier 122. In addition, a plurality of diodes 124, 126, 128 and 130 provide protection against unwanted transient voltages that might appear across lines 102 and 104. The common mode voltage present at the input of the ECL amplifier 122 is centered about the voltage that appears at the center tap of resistors 116 and 118. This voltage is derived from a reference voltage provided by the ECL 10,000 series gate 122 and buffered by a transistor 124.

In the absence of a differential voltage between lines 102 and 104 of the transceiver 10 of the present invention, the output of ECL amplifier 122 is biased to the quiescent state which corresponds to a logical 1. This biasing is accomplished with a current from a transistor 126. This current is present only during quiescent periods. Transistor 126 is turned off by a diode 128 going negative and held off by an RC time constant provided by a resistor 130 and a capacitor 132. The values of resistor 130 and capacitor 132 are chosen so that an RC time constant of approximately several bit cells results, and the subject component values indicated in FIG. 2 for a preferred embodiment are chosen for a nominal 10 megabit per second network. This assures that the waveform signal symmetry that appears at the output of ECL amplifier 122 is close to ideal in terms of its phase angle. ECL amplifier 122 thus appears as a linear amplifier during periods when there is a signal, but it has an offset voltage present at its input during quiescent periods in order to provide noise immunity. Further with respect to ECL amplifier 122 and buffer transistor 124, a plurality of resistors 134, 136, and 138 perform the function of pull-downs, and a pair of capacitors 139 and 140 attached as illustrated functions as a bias supply filters. The output of ECL amplifier 122 is coupled to the coaxial cable electronics by a transformer 142.

The receiver for the coaxial cable electronics, an ECL amplifier 144, performs a function similar to that of ECL amplifier 122. The input to ECL amplifier 144 has an offset applied during quiescent periods. This offset is removed if a signal of amplitude in excess of the offset threshold is present at the input. The offset circuit is constructed from a transistor 146, a diode 148, a resistor 150, and a capacitor 152. A pair of resistors 154 and 156 provide bias current to the input terminals of ECL amplifier 144. A capacitor 158 provides AC coupling but also prevents the inputs from being held at the same potential during quiescent periods. A capacitor 160 grounds AC signals at one of the inputs of ECL amplifier 144 in order to enhance common mode rejection across the transformer 142. Transformer 142 has an interwinding capacitance of approximately 30 picofarads in a preferred embodiment which, if connected directly to the 2.2K ohm load present at the input of ECL amplifier 144, would be able to couple high-frequency common mode noise directly into the signal path. Capacitor 160 performs the function of shorting out this common mode signal.

The output of ECL amplifier 144 is conveyed directly into a pair of pulldown resistors 162 and 164 and is coupled to the output drive circuitry through a pair of resistors 166 and 168. A diode 170 and a diode 172 also provide some bias adjustments for the receive stage (described in detail below). This is part of the time domain reflectometer (TDR) function and is described bolow. The signal that is coupled through resistors 166 and 168 has its rise time limited by a capacitor 174. This signal drives a differential pair of transistors which has a transistor 176 on one side and a transistor 178 on the other side. The emitters of transistors 176 and 178 are connected to a current source provided by a transistor 182 through a pair of resistors 183 and 184. The output of transistor 176 is delivered through diodes 186 and 188 to the center conductor of the coax cable 18. The signal impressed upon the coaxial cable 20 also receives additional rise time limiting at the collector of transistor 176 by a capacitor 190. The collector of transistor 178 is connected to a resistor 192 and a rise time limiting capacitor 194 such that the amplitude and phase of the voltage present at the collector of transistor 178 is exactly twice that present on the coaxial cable 20 but 180 degress out of phase. This inverted signal is used for the collision detection function and for the auxiliary TDR function (described below).

Figure 3:
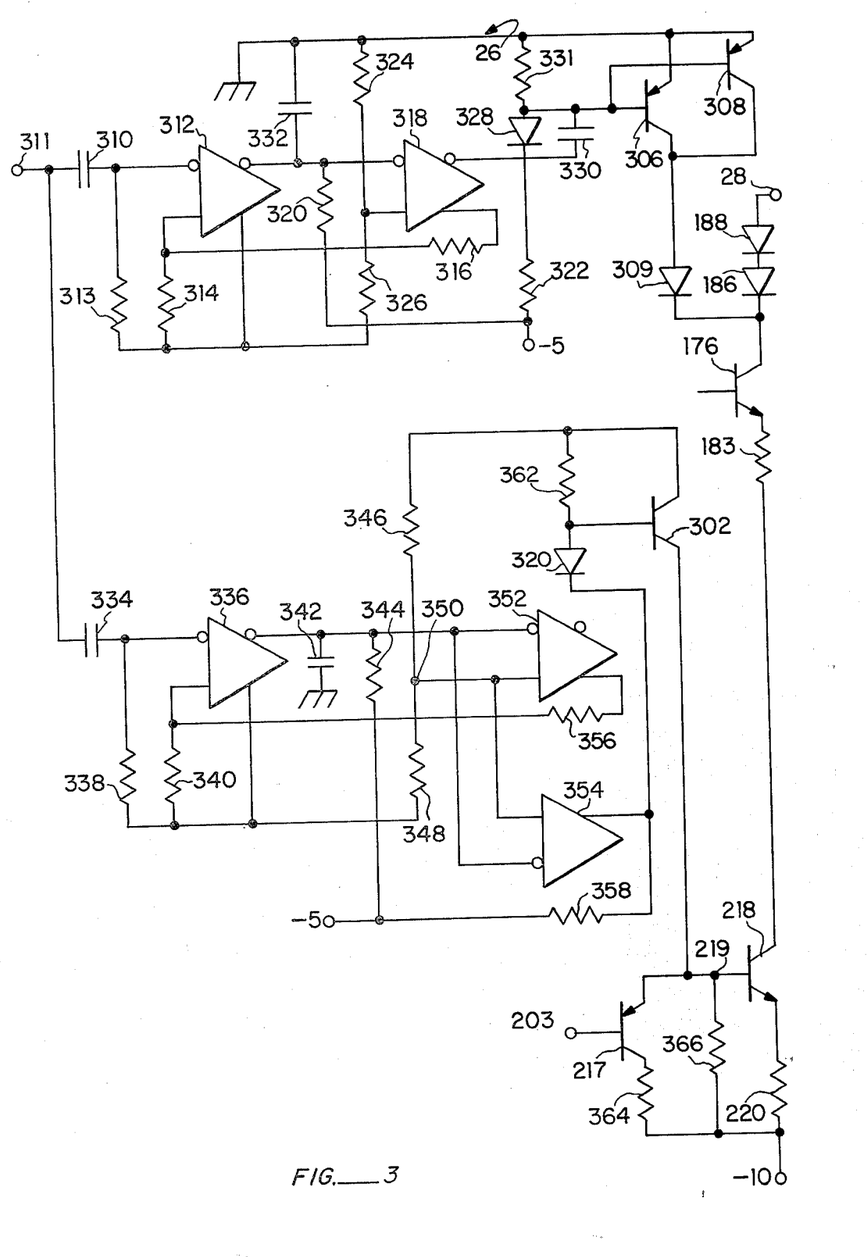
FIG. 3 is a schematic diagram of a preferred embodiment of the transmit protection circuitry of the Ethernet transceiver of the present invention.

The reference voltage used for the current sources is derived from an integrated circuit (IC) 196. The output of IC 196 is filtered by a capacitor 198. A resistor divider constructed from a resistor 200 and a resistor 202 splits the output voltage from IC 196 providing a voltage reference at circuit connection 203 to a transistor 204. Transistor 204 acts as an emitter follower with a resistor 206 functioning as the emitter resistor and a capacitor 207 providing filtering. A resistor 208 in the collector of transistor 204 is utilized for protection in the event that transistor 204 somehow becomes short-circuited. The voltage on the emitter of transistor 204 then is one base-emitter voltage drop above the reference from the voltage divider comprising resistors 200 and 202. The voltage at the emitter of transistor 204 is conveyed into the base of a transistor 210 such that the emitter voltage of transistor 210 is exactly the divided reference voltage above the negative supply. A resistor 212 attached to the emitter of transistor 210 determines the current that flows from the collector of transistor 210. This collector current from transistor 210 goes through a resistor 214 and is buffered by a transistor 216 in order to provide a reference input to the collision detection comparator (described below). This reference tracks the transmitted current level. Referring to FIG. 3, the center of the voltage divider formed by resistors 200 and 202 of FIG. 2 (that is, circuit reference 203) also drives the base of a transistor 217 in a similar fashion. The emitter of transistor 217 is connected to the base of a transistor 218 (note that the base of transistor 218 is a circuit reference point 219). Presuming that the base emitter voltage drops of the two transistors match and track in temperature, the voltage at the emitter of transistor 218 should be the same as that present at the center of the resistor 200/resistor 202 voltage divider. Thus, the current flowing from the collector of transistor 218 is determined by the reference voltage and a resistor 220 in the emitter circuit of transistor 218. Before discussion of the transmitter protection circuitry below, it should be noted that a capacitor 222 functions as a power supply filter, and a resistor 224 functions as a pull-down.

The transmitter output circuit has "triple redundancy" for protection purposes. This means that any two components in the output circuit can fail without causing a current to flow into the center conductor of the coaxial cable. Conversely, three conditions must be "true" for current to flow into the coaxial cable. The first condition that must be true is that the output switch constructed from the transistor differential pair 176 *and* transistor 178 be turned on. The second condition that must be true is that the current source be turned on. That is, a transistor 302 provides current to the current source through a resistor 304. An envelope detection circuit activated by the presence of a signal on the secondary of transformer 142 is used to turn on transistor 302. This circuit is described below. The third condition that must occur for current to flow into the center conductor of the coaxial cable is that a shunt implemented with a transistor 306 and a transistor 308 must be turned off. When the shunt is "on", the output current is diverted directly to ground through the shunt transistors 306 and 308. A diode 309 conducts current through the shunt constructed from transistors 306 and 308 and protects transistors 306 and 308 from large positive voltages which might appear across coaxial cable 20. Transistors 306 and 308 are likewise driven by an envelope detection circuit activated by the presence of signals on the secondary of transformer 142.

Two separate envelope detection circuits are used to turn "off" the shunt and to turn "on" the current source for the output circuits. A description follows of the current shunt envelope detection circuit.

A capacitor 310 connected at circuit reference 311 AC couples the signal from the secondary of transformer 142 to the input of an ECL amplifier 312 with input bias provided by a resistor 313. ECL amplifier 312 has an input offset applied during the quiescent state. This offset is the voltage developed across a resistor 314 as driven by a resistor 316 from the output of an ECL amplifer 318. The output of ECL amplifier 312 is an open emitter circuit with a pull down resistor 320 and a filter capacitor 322. The impedance of the open emitter output is equal to resistor 320 when pulling down and is approximately 7 ohms for positive going signal edges in a preferred embodiment. Capacitor 322 is charged to a positive voltage rapidly, but discharged very slowly through resistor 320. This signal is fed into ECL amplifer 318 and is compared against a reference provided by a resistor 324 and a resistor 326. The inverting output of ECL amplifier 318 is fed through resistor 316 to the inverting input of ECL amplifier 312 which, when in the high state, provides an offset at the input of ECL amplifier 312. When in the low state, the open emitter output simply floats at the bias voltage, and ECL amplifier 312 operates in the linear mode with no offsets present. The output of ECL amplifier 318 is at a level which corresponds to a logical "1" during the presence of transmitted data. This level remains at a logical "1" for a period after the end of the transmitted packet which is determined by capacitor 332 and resistor 320. The current shunt is turned on and off through the coupling of a diode 328 and a capacitor 330. Capacitor 330 accelerates the turn off of transistors 306 and 308 at the beginning of a transmission. Further, a resistor 331 performs the function of a pull-up to assure that transistors 306 and 308 are turned off when the output of ECL amplifier 318 goes high, and a resistor 332 performs the function of a pull-down at this output.

The envelope detection circuitry for the current source described above is similar to the envelope detection circuit for the current shunt. A capacitor 334 couples the signal input from circuit reference 311 to the input of an ECL amplifier 336. A pair of resistors 338 and 340 provide bias current to the inputs to ECL amplifier 336. The output from ECL amplifier 336 is connected to a capacitor 342 and a resistor 344. Resistor 344 provides the functions of a pull-down and with capacitor 342 provides an RC time constant which is relatively short for positive-going transitions at this node. A resistor 346 and a resistor 348 form a voltage divider providing a voltage reference at a circuit point 350 with respect to the output of ECL amplifier 336. As illustrated in FIG. 3, circuit point 350 is connected to one input of an ECL amplifier 352 and also to one input of an ECL amplifier 354. ECL amplifier 352 provides a bias offset to the input of ECL amplifier 336 through a resistor 356.

ECL amplifier 354 has an output identical to the output of ECL amplifier 352 in the quiescent state. However, when a signal appears, the output of ECL amplifier 354 is pulled to a logical "0" by a resistor 358. The output of ECL amplifier 352 at the same time floats halfway between a logical "0" and a logical "1" thus having no effect on the input to ECL amplifier 336. The output from ECL amplifier 354 is coupled through a diode 360 to transistor 302. A resistor 362 turns off transistor 302 when ECL amplifier 354 is in a logical "1" state. A resistor 364 is utilized for protection in the unlikely event that both transistors 203 and 218 become shorted. Further, resistor 366 limits the voltage at the base of transistor 218 in the event that transistor 217 becomes open circuited.

Receiver Section

Referring back to FIG. 2, the receiver is coupled to the coaxial cable by resistor 502 and is buffered by an emitter follower constructed by a transistor 504 and a resistor 506. The impedance that appears at the coaxial cable is very high (greater than 50,000 ohms in a preferred embodiment), and the capacitance is very low (only a few picofarads in a preferred embodiment). The signal on the emitter of transistor 504 is coupled to the input of an ECL amplifier 508 by a resistor/capacitor network constructed from a capacitor 510, a capacitor 512, and a resistor 514. The inverse of the locally transmitted signal is coupled to the same input by a capacitor 516, a capacitor 518, and a resistor 520. The values of the coupling resistors 514 and 520 and the capacitors 510, 512, 516, and 518 are selected such that 8/10ths of the magnitude of the transmitted signal is subtracted at the input of the receiver. This is designed so as to support the time domain reflectometer auxiliary function (described below). DC bias is supplied to the input of ECL amplifier 508 by a pair of resistors 522 and 524. The bias is filtered by a pair of capacitors 526 and 528. The output of ECL amplifier 508 is fed through a resistor 530 in parallel with a capacitor 531 and a resistor 532 in parallel with a resistor 533 to the input of a second ECL amplifier 534. Capacitors 531 and 533 provide high frequency emphasis to the amplification characteristics of the signals from ECL amplifier 508. A resistor 535 connected across the output from ECL amplifier 508 provides some signal attenuation. In the quiescent state, ECL amplifier 534 has an offset applied at its input which results in saturated logic levels at its output. This offset is removed if a signal received from the coaxial cable exceeds some predetermined threshold. The offset stays removed for a time period determined by a resistor 536 and a capacitor 538. This offset removal operates such that when a signal which exceeds the threshold appears at the input of ECL amplifier 534, it causes its output to rise to a saturated level. A diode 540 is connected to this output and pulls up the node defined by capacitor 538, resistor 536, a diode 542, and diode 540. Capacitor 538 must then discharge through resistor 536 before the offset can be reapplied to the input of ECL amplifier 534 via diode 542. A pair of resistors 543a and 543b provide the function of pull-downs with respect to the output of ECL amplifier 508.

Several other aspects of ECL amplifier 534 should be noted. First, a resistor 503 in conjuction with a capacitor 505 establishes an RC time constant. Said RC time constant is utilized to form a TDR function bias which causes the output of ECL amplifier 534 to be at a logical "1" when there is a pulse being transmitted by transceiver 10, and that bias will occur at a time determined by resistor 503 and capacitor 505 (nominally set to be several bit times). The TDR function bias is coupled to the input of ECL amplifier 534 by a diode 507. A pair of resistors 543a and 543b provide the function of power supply pull-downs for the output of ECL amplifier 534. Further, a resistor 545 and a capacitor 547 provide AC coupling from the output of ECL amplifier 534 and also prevent shorting the output of ECL amplifier 534 in the quiescent state.

The output of ECL amplifier 534 is coupled through a transformer 544 to the input of an ECL amplifier 546. ECL amplifier 546 also includes a bias offset circuit. That is, a capacitor 562 and a resistor 564 provide bias in the quiescent state to hold the output of ECL amplifier 546 in a logical "1" state. This bias is coupled to the input of ECL amplifier 546 by a transistor 566 and the bias is removed by a diode 568 when a signal is present. A capacitor 548 provides AC coupling at the input of ECL amplifier 546 such that the bias offset may be impressed upon it during the quiescent periods. A resistor 550 and a resistor 552 provide DC bias for the input of ECL amplifier 546. Further, a capacitor 549 provides common mode termination for transformer 544 so that the input is single-ended to ECL amplifier 546.

The output of ECL amplifier 546 drives a twisted pair of lines 554 and 556. A pair of diodes 558 and 560 provide protection at the output by clamping positive voltages which may exceed the supply voltage. This prevents the emitter/base junction of the output transistors of the amplifier from becoming damaged. Lastly, a pair of resistors 570 and 572 form the function of pull-downs, and a capacitor 574 AC couples the signal ground to the interface cable shield.

Collision Detection Section

The collision detection function is performed by subtracting the nominal value of the transmitted signal from the signal actually received from the coaxial cable 20. When no other stations are transmitting and the cable impedance is at its nominal value, this difference should be zero, and, in particular, it will be less than the reference provided by the reference-voltage source from transistor 216. An ECL amplifier 702 performs this comparison. The output of ECL amplifier 702 is a logical "1" unless there is a collision occurring. A resistor 703 performs the function of a pull-down for the output of ECL amplifier 702. An ECL amplifier 704 is connected such that it has positive feedback provided by a capacitor 706. When both inputs to ECL amplifier 704 have the same bias, the ECL amplifier 704 will oscillate at a frequency determined by capacitor 706 and a resistor 708. In a preferred embodiment, this frequency is designed to be nominally 10 Megahertz. If the input to ECL amplifier 704 is pulled high by the output of ECL amplifier 702, the output of ECL amplifier 704 will be held in a quiescent state, i.e. not oscillating.

The output of ECL amplifier 704 is connected to the −5 volt supply by a pair of pull-down resistors 709a and 709b and coupled to the collision detection balanced line driver 30 by a transformer 710. The output from transformer 710 is AC coupled by a capacitor 711 to the input to an ECL amplifier 712 which has a continuous offset applied by a resistor 714. As ideal waveform symmetry on the collision circuit signals is not required, some component economies can be realized as compared with the receiver balanced line driver 36. Also connected at the input side of ECL amplifier 712 is a capacitor 713 which ties one side of transformer 710 to ground for the purpose of noise immunity. Further, a pair of resistors 715a and 715b provide bias for the input to ECL amplifier 712.

The output of ECL amplifier 712 is coupled directly to a pair of controller interface lines 716 and 718. A pair of diodes 720 and 722 provide protection against positive voltage swings at the output of ECL amplifier 712. The protection is the similar to that provided for the receive circuitry (described above). A pair of resistors 724 and 726 perform the function of pull-down for the output of ECL amplifier 712.

Time Domain Reflectometer Function

The transceiver 10 of the present invention assists in performing time domain reflectometer measurements by permitting very wide pulses to be transmitted into the coaxial cable. In the following description, the quiescent state is a logical "1", and the non-quiescent state is a logical "0". During the period of the long pulse, the collision detection lines 716 and 718 can be monitored for the occurrence of a transition from the non-quiescent state of the collision lines 716 and 718. Likewise, the receive lines 554 and 556 can be monitored for a transition from the active state to the quiescent state. In the case of the receive lines 554 and 556, however, the state of the line would already have changed to a logical "0" because of the transmitted pulse. A transition back to the quiescent state before the end of the transmitted pulse would indicate a low impedance reflection from the coaxial cable. The collision detection lines 716 and 718 would go to the non-quiescent state (that is, logical "0") if a voltage on the coaxial cable exceeds the nominal transmitted voltage by more than 20%. The receive signal will be driven to a logical "1" in the presence of a transmitted pulse if the voltage on the coaxial cable is less than 80% of the nominal value of that transmitted pulse. As mentioned earlier, this subtraction for the receive signal occurs at the input of ECL amplifier 508. The component values of capacitor 516, capacitor 518, and resistor 520 are chosen for the subtraction part of the signal and component values of capacitor 510, capacitor 512, and resistor 514 are connected to the positive signals coming from the coaxial cable. The subtraction at the collision circuits occurs at the input to ECL amplifier 702. A resistor 724 and a resistor 726 are chosen to exactly null the transmitted signal. The threshold which must be exceeded is derived from transistor 216. The emitter base voltage drops of transistor 216, a transistor 728 and transistor 504 are all matched and track with temperature to provide temperature stability. Further, a resistor 730 is connected to the base of transistor 728 and chosen to match resistor 502 so that the input circuit to transistor 728 matches the input circuit to transistor 504. Finally, a resistor 732 acts as an emitter pull-down.

A Note on Electromagnetic Interference

The isolation stage provided by transformers 142, 710 and 544 has potential for creating electromagnetic interference. This is due to the interwinding capacitance present in each of these transformers. Note that the transformers 142, 710, and 544 are driven in a balanced fashion and are terminated in an unbalanced fashion. In this case, "unbalanced" means that one side of the transformer is tied to an AC ground. A plurality of capacitors 802, 804 and 806 are connected across the subject interstage transformers so that the impedance that appears at the primary of the transformer is balanced with respect to the ground connection at the secondary of the transformer. Similar balancing is performed in the DC Power Inverter (described hereafter).

DC Power Inverter

Figure 4:
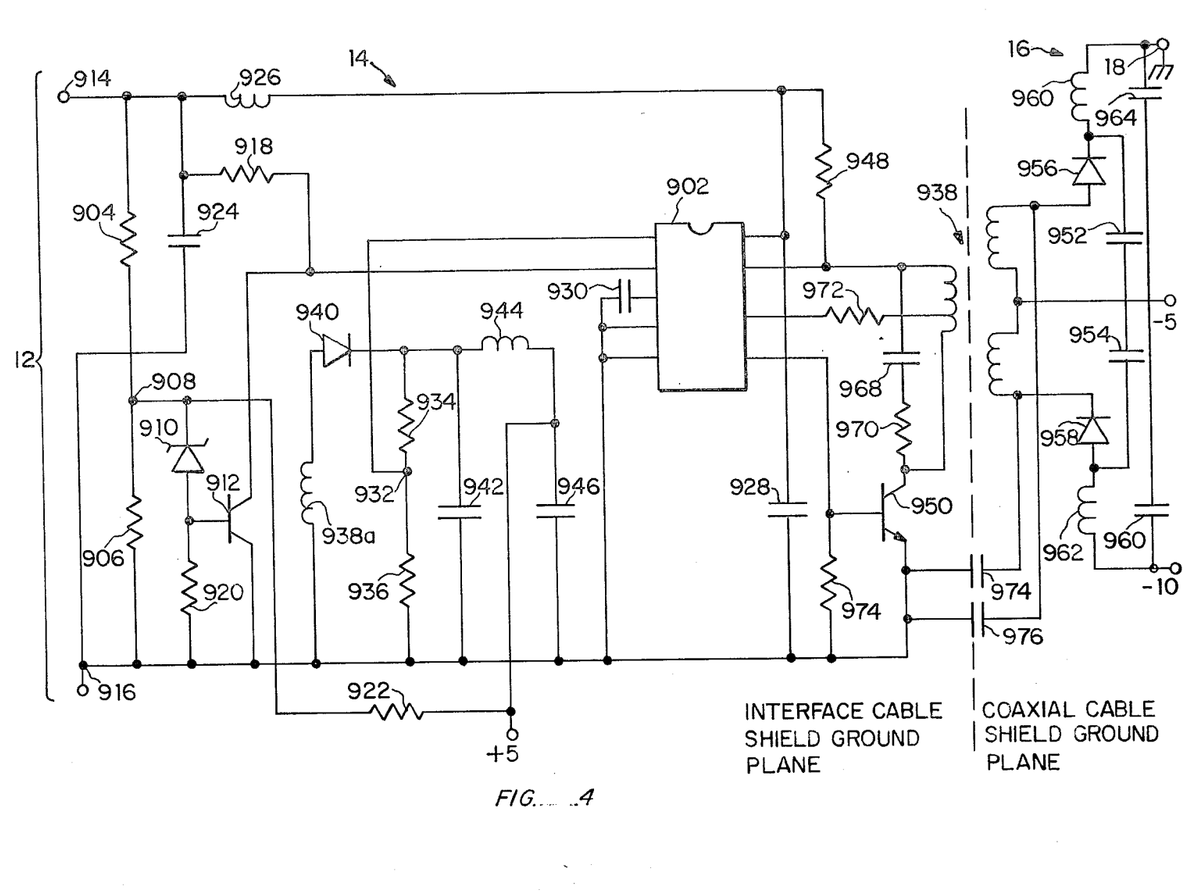
FIG. 4 is a schematic diagram of the power supply circuitry of the Ethernet transceiver of the present invention.

Referring to FIG. 4, power for the transceiver 10 of a preferred embodiment of the present invention is provided by a DC to DC inverter with transformer isolation. Generally speaking, the inverter, i.e. switching regulator drive circuit 14, is a flyback switching regulator type of inverter. After passing through an isolation transformer, the inverter provides three output voltages. One output voltage is on the primary side of the regulator along with the supply voltage, and the other two output voltages appear on the isolated side of the inverter. Regulation is achieved by feeding back the voltage present on the supply side of the inverter and holding that to a constant value. The voltages on the isolated side of the inverter track this voltage through the turns ratio of a flyback transformer. The inverter operates above the audible frequency range. Rectification of the voltage from the inverter illustrated in FIG. 4 is achieved through two diodes tied to the secondary windings of the transformer. Filtering is provided by large capacitors and subsequent filtering is done through inductors and smaller capacitors. The switching frequency of the inverter is thus filtered at both the input DC line and at all of the output DC lines. Common mode voltage at the switching frequency of the inverter is nulled out by the capacitors tied to the ground at the supply side of the system and tied to the secondary of the isolated supply windings. The inverter provides regulation by operating at a frequency inversely proportional to the input voltage. The pulse width is constant for a preferred embodiment.

Referring to FIG. 4 for a description of a preferred embodiment, a holdoff circuit connected to the inhibit input of a regulator integrated circuit (IC) 902 holds the switching regulator drive circuit 14 off for voltages less than 8 volts. This guarantees that the supply current will never exceed 0.5 amperes (the switching regulator drive circuit 14 in a preferred embodiment draws constant power and, thus, for low supply voltages it is possible that an excessive amount of current could be drawn if the holdoff circuit was not employed). The holdoff circuit is constructed from a resistor 904 and a resistor 906 which form a voltage divider with respect to the DC input voltage at the first pair of connections 12. The center of said voltage divider at a circuit reference point 908 is connected through a zener diode 910 to the base of a transistor 912. When the voltage across a first pair of connections 12 (i.e. across a circuit reference point 914 and a circuit reference point 916) rises to 8 volts in a preferred embodiment, the voltage at circuit reference point 908 will equal the breakdown voltage of the zener diode 910 plus the base/emitter voltage drop of transistor 912. When this occurs, transistor 912 turns on pulling down a resistor 918. The junction of the collector of transistor 912 and resistor 918 is connected to the inhibit input of IC 902. A resistor 920 connected between the base and emitter of transistor 912 assures that transistor 912 stays turned off when the input voltage across circuit reference points 914 and 916 is nominally below 8 volts. A resistor 922 connected between circuit reference point 908 and the +5 volt provides positive feedback hysteresis thus preventing oscillation of the switching regulator drive circuit 14 when the input supply across circuit reference points 914 and 916 is near 8 volts (nominal).

Turning attention to the main switching regulator function of switching regulator drive circuit 14, a capacitor 924 and an inductor 926 provide filtering of switching transients present on a main supply filter capacitor 928. IC 902 in a preferred embodiment is a Texas Instruments TL497 which produces a constant pulse width variable frequency pulse train. The width of the pulses is controlled by a capacitor 930. The frequency of the pulse train is determined by the voltage sensed by IC 902 a circuit reference point 932. The voltage at circuit reference point 932 is derived from a voltage divider constructed from a resistor 934 and a resistor 936. One side of the voltage divider is connected to circuit reference point 916, i.e. the negative DC return, and the other side of the voltage divider is connected to the +5 volt output of a power supply transformer 938 (for the purposes of clarity, the +5 volt output of power supply transformer 938 is but a winding 938a of said power supply transformer 938). Winding 938a forms the function of a flyback regulator and is connected to a diode 940. A capacitor 942 filters the +5 volt output which is further smoothed by an inductor 944 and a capacitor 946.

The main power path through switching regulator drive circuit 14 is through a resistor 948, power supply transformer 938, and a transistor 950. Resistor 948 senses the current flowing through the power supply transformer 938 and causes the switching regulator drive circuit to shut off if the current becomes excessive. In operation IC 902 turns on transistor 950 for a fixed period of time and then turns it off. The voltage across all of the individual windings of transformer 938 then reverse until said voltages reach the respective voltages of capacitor 942, a capacitor 952 and a capacitor 954. Thereafter current is dumped into capacitors 942, 952, and 954 through diode 940, a diode 956, and a diode 958. Additional filtering is provided by inductor 944 and by a pair of inductors 960 and 962 and capacitor 946 and a pair of capacitors 964 and 966. Oscillations of switching regulator drive circuit 14 are suppressed by the RC circuit constructed from a capacitor 968 and a resistor 970. A resistor 972 is connected between a tap of power supply transformer 938 and a drive input of IC 902 and limits the drive current to transistor 950. A resistor 974 speeds the turnoff of transistor 950 by removing base charge when the output from IC 902 turns off.

A pair of capacitors 974 and 976 are selected to balance any imbalance that may be present in the windings of power supply transformer 938. This balancing tends to minimize the voltage at the switching frequency of the switching regulator drive circuit 14 that might appear between the DC return (i.e. circuit referenc points 916) and the shield of the coaxial cable (circuit reference point 18).

For ease of implementation of a preferred embodiment of the transceiver 10 of the present invention, ECL amplifiers 122, 144, 312, 318, 336, 352, 354, 508, 534, 546, 702, 704, and 712 have successfully employed Motorola MC10116 components.

While for the sake of clarity and ease of description, a specific embodiment of the present invention has been described hereinabove, the scope of the present invention is intended to be measured by the claims as set forth hereafter. It is clear that those skilled in the art to which the present invention applies will be able to practice the present invention with variations in structure from the preferred embodiment. All such equivalent variations within the scope of the following claims are intended to be part of the present invention.

What I claim is:

1. A local computer network coaxial cable transceiver for connection to a coaxial cable, said transceiver comprising:
   a transmitter constructed from
   a transmitter balanced line receiver termination circuit, said transmitter balanced line receiver termination circuit having a balanced differential input port for connecting to a first host CPU controller interface, and a balanced differential output port;
   a transmitter isolation transformer having a balanced differential input side and a balanced differential output side, said balanced differential input side being connected to said balanced differential output port of said transmitter balanced line receiver termination circuit; and
   a transmitter current source, switch and voltage reference circuit, said transmitter current source, switch and voltage reference circuit having a balanced differential signal input port and a signal output port, said transmitter current source, switch and voltage reference circuit having a switch means, a voltage reference means and a current source means, said current source means being operative to develop a current, said current being developed from reference to said voltage reference means, said current source means being coupled to said switch means for controlling signal path switching through said switch means, said balanced differential input port of said transmitter current source, switch and voltage circuit being connected to said balanced differential output side of said transmitter isolation transformer, and said signal output port of said transmitter current source, switch and voltage reference circuit being adapted for direct current coupling to said coaxial cable;
   a receiver constructed from
   a receiver balanced line driver circuit, said receiver balanced line driver circuit having a balanced differential output port for connecting to a second host CPU controller interface and a balanced differential input port,
   a receiver isolation transformer having a balanced differential input side and a balanced differential output side, said balanced differential output side being connected to said balanced differential input port of said receiver balanced line driver, and a receiver input compensation and amplifier circuit, said receiver compensation and amplifier circuit having a balanced differential output port coupled to said balanced differential input side of said receiver isolation transformer, said receiver input compensation and amplifier circuit having a signal input port adapted to be direct current coupled to said coaxial cable; and a collision detection circuit constructed from a collision detection balanced line driver, said collision detection balanced line driver having a balanced differential output port coupled to a third host CPU controller interface, a collision detection isolation transformer having a balanced differential output side coupled to a balanced differential input port of said collision detection balanced line driver, and a balanced differential input side, and a collision comparator and oscillator circuit, said collision comparator and oscillator circuit having a balanced differential output port coupled to the balanced differential input side of said collision detection isolation transformer, and having a signal input port adapted to be DC coupled to said coaxial cable;

wherein said transmitter isolation transformer, said receiver isolation transformer and said collision detection isolation transformer form a division between a ground plane associated with a host CPU controller interface and a ground plane associated with said coaxial cable.

2. The local computer network coaxial cable transceiver of claim 1, wherein said transmitter current source, switch and voltage reference circuit further comprises a current shunt subcircuit connected between a center conducter and a shield of said coaxial cable, said current shunt circuit being operative to direct current to flow into said center conductor of said coaxial cable if and only if said switch means is turned on, said current source is turned on, and said current shunt is turned off.

3. The local computer network coaxial cable transceiver of claims 1 or 2, wherein said collision comparator and oscillator circuit further comprises means for generating a signal 180° out of phase from the signal generated by said transmitter, a collision detection voltage reference, a comparator circuit, and an adder circuit wherein said collision comparator and oscillator circuit is operative to detect a collision by adding in said adder circuit said signal 180° out of phase from said transmitted signal and said transmitted signal thereby being operative to generate a difference signal and to compare in said comparator circuit said difference signal with a reference signal of said collision detection voltage reference.

4. The local computer network coaxial cable transceiver of claim 3, wherein said transmitter further comprises a transmitter voltage reference wherein the signal transmitted into said coaxial cable by said transmitter and said signal generated 180 degrees out of phase from said transmitted signal both are derived from said transmitter voltage reference.

5. The local computer network coaxial cable transciever of claim 4, wherein said collision detection voltage reference is said transmitter voltage reference.

6. The local computer network coaxial cable transceiver of claims 1 or 2, wherein said receiver input compensation and amplifier circuit further comprises a first amplifier driven at its input by (1) a buffer amplifier connected to said coaxial cable with said buffer amplifier driving said frist amplifier through an AC coupling stage with high frequency emphasis and (2) an inverted output from said transmitter, and a second amplifier driven by the output from said first amplifier through a second coupling stage with high frequency emphasis with the output from said second amplifier driving said receiver isolation transformer.

7. The local computer network coaxial cable transceiver of claim 3, wherein said signal generated 180 degrees out of phase from said transmitted signal is connected to the input to said receiver enabling subtraction in said receiver of a substantial portion of the signal received from said coaxial cable in order to permit a time domain reflectometer function.

8. The local computer network coaxial cable transciever of claim 5, further comprising:

a power supply circuit constructed from a switching regulator drive circuit connected at its input side to a fourth host CPU controller interface with said switching regulator drive circuit providing nominally +5 volts DC to said transmitter balanced line receiver termination, said collision detection balanced line driver, and said receiver balanced line driver, a power supply transformer connected at its input side to the output side of said switching regulator drive circuit, and a rectifier and filter capacitor circuit connected at its input side to said power supply isolation transformer and on its output side to the shield of said coaxial cable and providing nominally −5 volts DC and −10 volts DC to said transmitter current source and voltage reference circuit, said collision comparator and oscillator circuit, and said receiver input compensation and amplifier circuit.

* * * * *